(12) United States Patent
Loaiza et al.

(10) Patent No.: US 7,376,744 B2
(45) Date of Patent: May 20, 2008

(54) USING LOCAL LOCKS FOR GLOBAL SYNCHRONIZATION IN MULTI-NODE SYSTEMS

(75) Inventors: Juan Loaiza, Redwood City, CA (US); Sashikanth Chandrasekaran, Belmont, CA (US); Neil MacNaughton, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 754 days.

(21) Appl. No.: 10/435,229

(22) Filed: May 9, 2003

(65) Prior Publication Data
US 2004/0225742 A1 Nov. 11, 2004

(51) Int. Cl.
*G06F 13/00* (2006.01)
(52) U.S. Cl. ...................... 709/229; 710/200
(58) Field of Classification Search ............... 709/229; 710/200, 108
See application file for complete search history.

(56) References Cited

U.S. PATENT DOCUMENTS

| | | | |
|---|---|---|---|
| 4,814,971 A | 3/1989 | Thatte | |
| 5,285,528 A | 2/1994 | Hart | |
| 5,440,732 A | 8/1995 | Lomet et al. | |
| 5,454,108 A | 9/1995 | Devarakonda et al. | |
| 5,596,754 A * | 1/1997 | Lomet ....................... | 710/200 |
| 5,682,537 A | 10/1997 | Davies et al. | |
| 5,832,484 A | 11/1998 | Sankaran et al. ............... | 707/8 |
| 6,026,474 A | 2/2000 | Carter et al. | |
| 6,272,491 B1 | 8/2001 | Chan et al. | |
| 6,353,836 B1 | 3/2002 | Bamford et al. | |
| 6,453,404 B1 | 9/2002 | Bereznyi et al. | |
| 6,529,906 B1 | 3/2003 | Chan | |
| 6,668,295 B1 | 12/2003 | Chan | |
| 6,915,387 B1 | 7/2005 | Huffman et al. | |
| 6,920,454 B1 | 7/2005 | Chan | |
| 7,085,911 B2 | 8/2006 | Sachedina et al. | |
| 2002/0087736 A1* | 7/2002 | Martin ....................... | 709/312 |
| 2005/0149540 A1 | 7/2005 | Chan et al. | |
| 2006/0212573 A1 | 9/2006 | Loaiza et al. | |

OTHER PUBLICATIONS

Andrew S. Tanenbaum; Structured Computer Organization (Second Edition); 1984.*
Lory D. Molesky et al., "Database Locking Protocols for Large-Scale Cache-Coherent Shared Memory Multiprocessors: Design, Implementation and Performance," Jun. 6, 1995, pp. 1-24.
Lory D. Molesky et al., "Efficient Locking for Shared Memory Database Systems," Mar. 1994, 28 pages.
Written Opinion from PCT Patent Application No. PCT/US02/06981,dated Oct. 3, 2004(8 pgs.).
Current Claims in PCT Patent Application No. PCT/US02/06981 (8 pgs.), dated Oct. 3, 2004.
Office Action from Canadian Patent Application No. 2,448,050,dated Oct. 1, 2004 (2 pgs).
Current Claims in Canadian Patent Application No. 2, 448,050 (48 pgs), dated Oct. 1, 2004.

(Continued)

*Primary Examiner*—Kenneth R. Coulter
(74) *Attorney, Agent, or Firm*—Hickman Palermo Truong & Becker LLP

(57) ABSTRACT

Described herein are techniques for global synchronization that under various scenarios eliminate or defer the acquisition of global locks. In many cases, the need to acquire global locks is eliminated, thereby saving the overhead attendant to processing global locks.

20 Claims, 5 Drawing Sheets

OTHER PUBLICATIONS

Office Action from European Patent Application No. 01968979.3-2212, dated Aug. 6, 2004 (3 pgs.).

Current Claims in European Patent Application No. 01968979.3-2212 (3 pgs), dated Aug. 6, 2004.

* cited by examiner

USING LOCAL LOCKS FOR GLOBAL SYNCHRONIZATION IN MULTI-NODE SYSTEMS

FIELD OF THE INVENTION

The present invention relates to synchronization mechanisms in computer systems, and in particular, efficiently synchronizing access to resources by nodes in a multi-node systems.

BACKGROUND OF THE INVENTION

Multiple processes running on multi-processing systems may access "shared resources." Some of these shared resources may be accessed by only one process at a time, while others may be accessed concurrently by multiple processes. Consequently, "synchronization mechanisms" have been developed to control access by multiple processes to shared resources. The synchronization mechanism grants locks to processes. Locks grant to holders of the locks the right to access a particular resource in a particular way. Once a lock is granted to a process, the process holds or owns the lock until the lock is relinquished, revoked, or otherwise terminated. Locks are represented by data structures such as semaphores, read/write latches, and condition variables. There are many types of locks. Some types of locks allow shared resources to be shared by many processes concurrently (e.g. shared read lock), while other types of locks prevent any type of lock from being granted on the same resource (exclusive write lock).

The entity responsible for granting locks is referred to herein as a lock manager. In a single node multi-processing system, a lock manager is typically a software component executed and invoked by processes on the node accessing a shared resource.

In contrast to a single node system, a multi-node system consists of network of computing devices or "nodes, each of which may be a multi-processing system. Each of the nodes can access a set of shared resources. Multi-node systems use synchronization mechanisms, referred to as global synchronization mechanisms, to control access to the set of shared resources by nodes in the multi-node system.

A global lock mechanism includes a global lock manager that is responsible for issuing locks to processes on the multi-node system. In order for a node to access a shared resource, it is granted a "global lock" by a global lock manager. A global lock is a lock that can be granted by a global lock manager on a node in a multi-node system to one or more processes on another node to coordinate access to the shared resources among the processes executing on any node in a multi-node system.

One type of global lock manager, a central global lock manager, is responsible for issuing locks for all shared resources in a multi-node system. Another type of global lock manager, a distributed lock manager, is comprised of local lock managers, with one or more of the local lock managers running on each node in a multi-node system. Each lock manager is responsible for coordinating the global locks that are needed to access a subset of shared resources.

Nodes are described herein as performing actions and as being the object of actions. However, this is just a convenient way of expressing that one or more processes on a node are performing an action or is the object of an action. For example, a node accessing a shared resource or granting, holding, or being issued a lock is just a convenient way of expressing that a process on the node is accessing a shared resource or granting, holding, or being issued a lock.

In a distributed lock manager, a local lock manager residing on a node issues global locks to both processes on other nodes and to processes running on the same node as the local lock manager. A local lock manager is referred to as the local lock manager with respect to the node on which it resides; the node and a process running on the node are referred to as a local process and local node with respect to the local lock manager. In addition to a local lock manager on a node issuing global locks, a node in a multi-node system may issue local locks to local processes. Local locks are granted by a node only to local processes running on the node. In fact, in some distributed lock management systems, a local lock manager must obtain a local lock to a shared resource before obtaining a global lock. Local locks are used for exactly the same resources as the global locks. Only the scope of the locking is different. The local locks are used to synchronize access to shared resource among local processes in the node whereas global locks are used to synchronize access to the same shared resource among processes running on separate nodes. Examples of local locks include operating system locks on such resources as files or portions of memory.

Some local lock managers may obtain a global lock for a shared resource on behalf of one or more local processes. The local lock manager then issues local locks to the local processes to coordinate access among the local processes to the shared resource.

Global locks are more expensive than acquiring only local locks. Usually, local locks are issued in conjunction with global locks. Thus, issuing global locks entails executing instructions and creating data structures for both local locks and global locks. Even more, acquiring a global lock may entail inter-node communication in the form of messages transmitted between a local lock manager on one node and processes and/or a local lock manager on another node. Hence, techniques are needed to reduce the cost of acquiring global locks.

One technique to reduce the cost of acquiring global locks is to use a "mastering technique" that assigns a master node to a subset of shared resources based on patterns of access to shared resources. (A master node for a shared resource governs access by other nodes to the shared resources.) For example, if most of the accesses to a portion of shared data are performed by a particular node, that node is assigned as the master node for that portion of the shared data. This reduces the messaging overhead between nodes but does not eliminate the cost of executing more instructions to acquire a global lock.

Another technique to reduce the cost of acquiring global locks is to use coarse-grain locking. In this scheme, locks are acquired at a higher level of granularity, such as a table or file, instead of a finer level of granularity, such as a row or a disk block. When a lock is acquired at the higher level of granularity, it is implicitly granted for levels of shared data at a finer level of granularity. For example, if a global lock is acquired for an entire table, individual global locks for the rows or blocks for the table are implied and do not have to be acquired, avoiding the cost of obtaining a global lock for each row and block.

The advantage of this technique is that it does not depend on the assignment of a master node. A significant disadvantage, however, is that this technique can lead to false contention. Specifically, if a node needs to modify a row in a table that has been locked by another node in a conflicting mode, that node must relinquish the lock on the table although the two nodes may be accessing different rows or even different blocks.

Another technique to reduce the cost of acquiring global locks is to use hierarchical locking. In this scheme, locks are first acquired at a higher level in the hierarchy, such as a table. If a global lock is acquired at a higher level in the hierarchy, global locks are implicitly granted at the lower level of the hierarchy. When another node subsequently needs to access data in the lower level of the hierarchy, such as a row or a block, in a conflicting mode, the first node de-escalates its lock and acquires locks at the lower level in the hierarchy.

The disadvantage of this technique is that the cost of obtaining a global lock is inflated and shifted to the requesting node whose lock request triggers the de-escalation. To honor the request, work is performed to acquire global locks for all the shared data at the lower level of the hierarchy. This work is performed despite the requesting node having requested a lock on only a small portion of the shared data.

As clearly shown, techniques are needed to reduce the cost of acquiring global locks that avoid the pitfalls attendant to techniques described above for reducing the cost of global locks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for reducing the cost of global locking is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for global synchronization that under various scenarios eliminate or defer the acquisition of global locks. In many cases, the need to acquire global locks is eliminated, thereby saving the overhead attendant to processing global locks.

Figure 1:
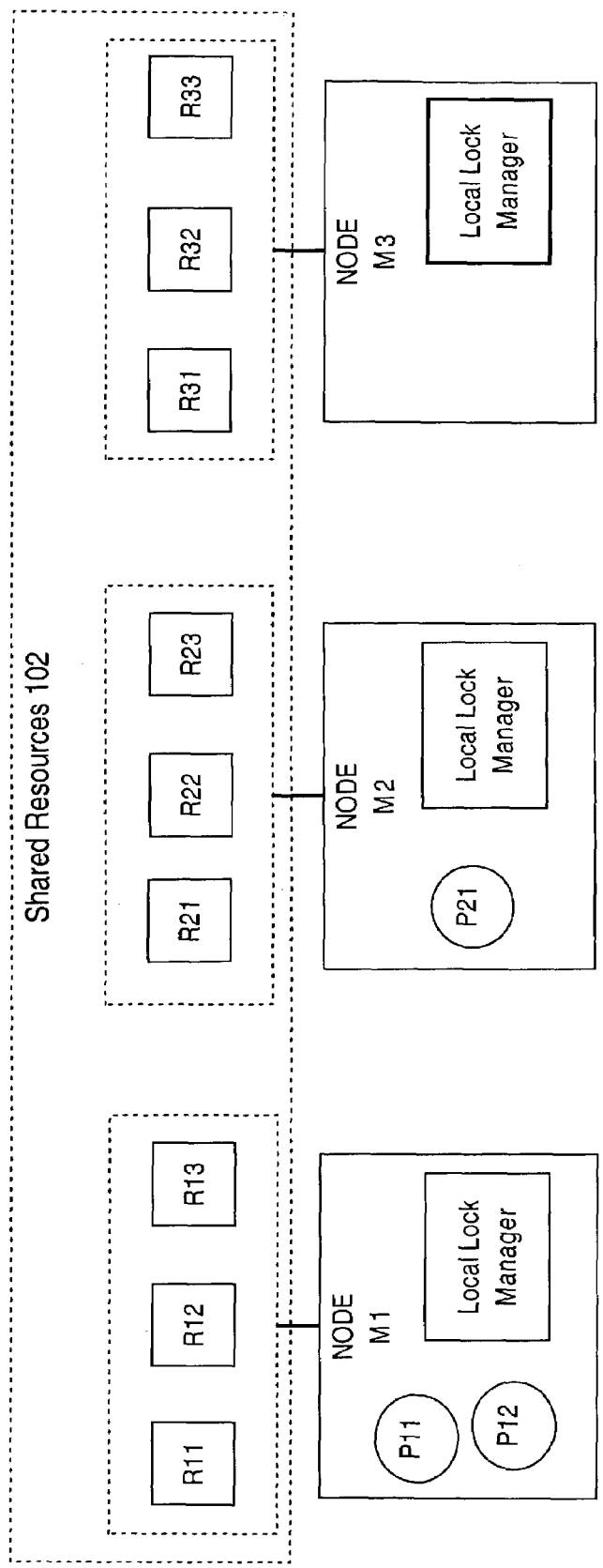
FIG. 1 is a block diagram that depicts a multi-node system upon which an embodiment of the present invention may be implemented.

FIG. 1 is a block diagram depicting a multi-node system 101 system upon which an embodiment of the present invention may be used. Referring to FIG. 1, multi-node system 101 includes node M1, node M2, and node M3. Nodes M1, M2, and M3 access shared resources 102. Shared resources can be any kind of computer resource, including volatile and non-volatile memory, input/output peripheral devices, and data stored in non-volatile or volatile memory (e.g. database data blocks, a file or portion thereof, buffers in memory that hold such data). Access to shared resources by nodes M1, M2, and M3 is controlled by a global synchronization mechanism that includes a distributed lock manager with a local lock manager on each of nodes M1, M2, and M3.

Each of nodes M1, M2, and M3 are assigned as masters to a subset of shared resources 102. Node M1 is the master of shared resources R11, R12, and R13, node M2 is the master of shared resources R21, R22, and R23, and node M3 is the master of shared resources R31, R32, and R33. Shared resources to which access is governed by a master node are referred to as being mastered by that node.

Multi-node system 101 may be a shared everything system, a shared disk system, or a shared nothing system. In a shared everything system, processes on all processors have direct access to all volatile memory devices and to all disks (or other static memory devices) in the system. In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node. In shared nothing systems, all processors, memories and disks are grouped into nodes. In shared nothing systems as in shared disk systems, each node may itself constitute a shared everything system or a shared disk system. Only the processes running on a particular node can directly access the memories and disks within the particular node.

Figure 2:
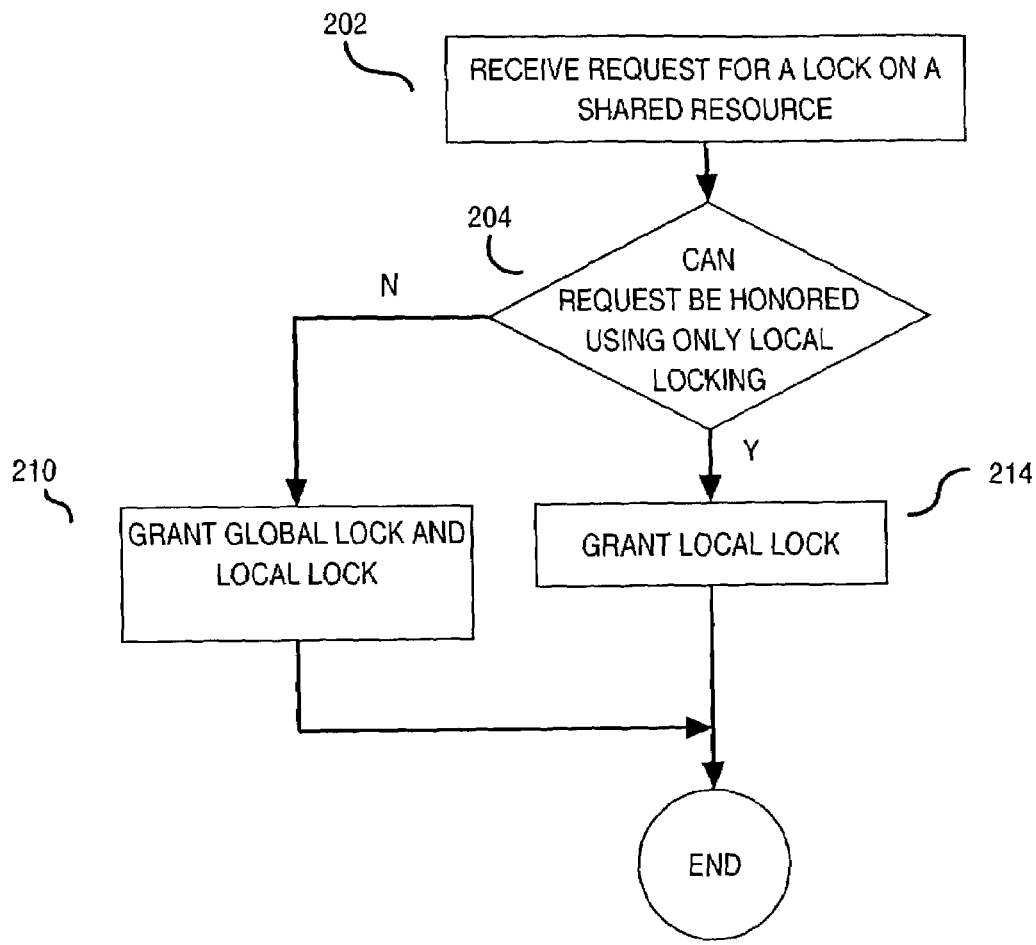
FIG. 2 is a flow chart depicting a process for avoiding global locks according to an embodiment of the present invention.

Using Local Locking Only When Local Processes are Accessing Locally Mastered Resources In order for a process on a node to access a shared resource for which the local node is not a master, the process must first acquire a global lock. However, for a local process accessing a shared resource mastered by the local node, only a local lock may be needed to control access to the shared resources. Cases where only local locking is used are described in greater detail below. In such cases, the acquisition of a global lock is foregone or deferred until a global lock is actually needed. In many cases, a global lock may not be needed. FIG. 2 is a flowchart of a process that avoids global locks in this way.

The process depicted in FIG. 2 is illustrated using an example that involves the components depicted in multi-node system 101. In the example, a process P11 running on node M1 needs to acquire a lock on resource R11. There is currently no local or global lock held for resource R11.

Referring to FIG. 2, at step 202, the local lock manager on node M1 receives a request from local process P11 for a lock on resource R11.

At step 204, the local lock manager determines whether it can honor the request using only a local lock. If so, then execution proceeds to step 214, where only a local lock is issued to process P11. Otherwise, execution proceeds to step 210, where a global lock is issued to process P11.

The determination of whether a request for a lock may be honored with only a local lock depends on a variety of factors and conditions. One condition is that the resource requested by a process is mastered by a node other than the local node for the process. In this case, the request cannot be honored with only a local lock and a global lock will have to be obtained.

Another condition is that the resource requested by a process is mastered by the local node of the process and no global lock is currently held by another node (i.e. no process owns a global lock on the resource or only local processes of the master own a local lock on the resource). In this case, the request can be honored with only a local lock.

In the current example, there is no holder of a lock for resource R11. Therefore, the request is honored at step 214 by only granting a local lock.

Generally, contention for a shared resource by only local processes may be managed using only local locking. If while process P11 holds the local lock granted at step 214, a local process such as P12 requests a lock on resource R11, access by P11 and P12 may be controlled using only local locks issued by node M1. Thus, at step 204, the determination made for the lock request by P12 would be that the lock request can be honored with only a local lock because the only lock held on the resource is the local lock held by process P11. At step 214, process P12 is granted a local lock.

Making Local Locks Global

While process P11 and P12 own local locks on resource R11, node M2 requests a global lock on shared resource R11. As a result, global synchronization using global locks is required for all nodes accessing shared resource R11. Processes P11 and P12, which hold only local locks to shared resource R11, now need a global lock.

Figure 3:
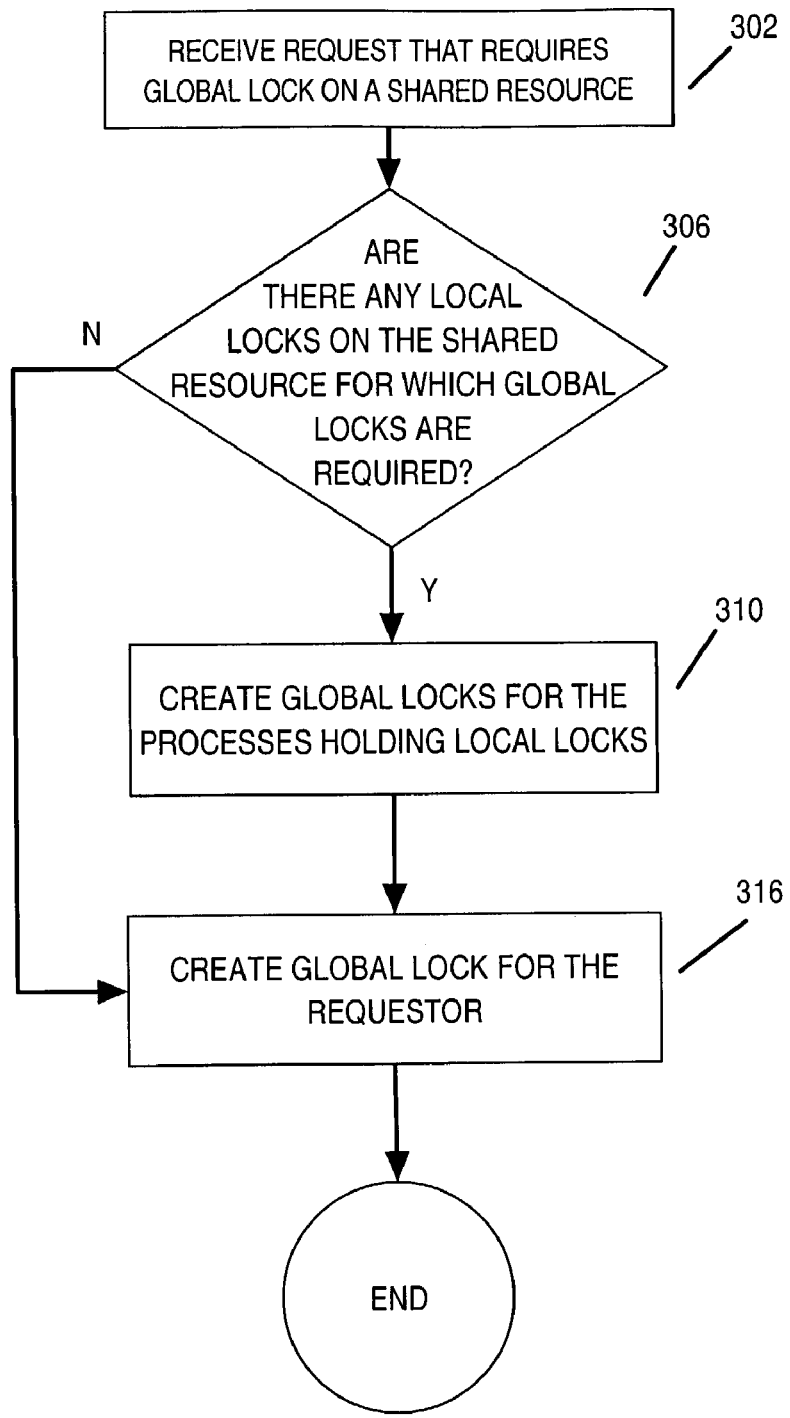
FIG. 3 is a flow chart depicting a process providing global locks for processes that were globally synchronized using only local locks according to an embodiment of the present invention.

FIG. 3 shows the steps that are performed by a master node when there are only local locks held for a shared resource when a remote node requests a global lock. The steps are illustrated using the current example involving P11 and P12.

Referring to FIG. 3, at step 302, node M1 receives a request from node M2 for a global lock on resource R11. At step 306, node M3 determines whether there are any local locks on the shared resource for which global locks are required. If there are no such local locks, then execution of the steps proceeds to step 316, where a global lock is granted to the requester of the request received at step 306. In the current example, process P11 and P12 hold local locks but not global locks on resource R11. Execution of the steps proceeds to step 316, where the processes holding the local locks are issued a global lock.

The techniques for avoiding or deferring global locking discussed above may be advantageously used in conjunction with access-pattern based mastering techniques, in which shared resources are assigned to the node that most often accesses the shared resource relative to other nodes in a multi-node system. This increases the probability that a particular process requesting a lock is a local process, that other processes that hold a lock on the shared resource are also local processes, and that the request may be handled using only local locking.

While an embodiment of the present invention may be implemented using mastering techniques based on access patterns, the present invention is not so limited. Other mastering techniques include, for example, mastering techniques that assign shared resources randomly to nodes, that assign resources according to a master-resource mapping provided by the user, or that assign them by applying a hashing system.

Avoiding Global Locks When Creating Shared Resources

Another scenario in which a global lock can be avoided or deferred to access a shared resource is the creation of a shared resource by a process. An example of creating a new shared resource is allocating a new database data block in a database system. To create a shared resource the process creating the shared resource acquires a lock on the shared resource. No other process can be holding a global lock on the resource when the resource is created. There is therefore no need for the process that created the shared resource to obtain a global lock on the shared resource in order to create and access the resource. Therefore, the process creating the resource need only obtain a local lock. Furthermore, the local lock may be granted without having to determine whether another process holds a global lock on the shared resource.

Figure 4:
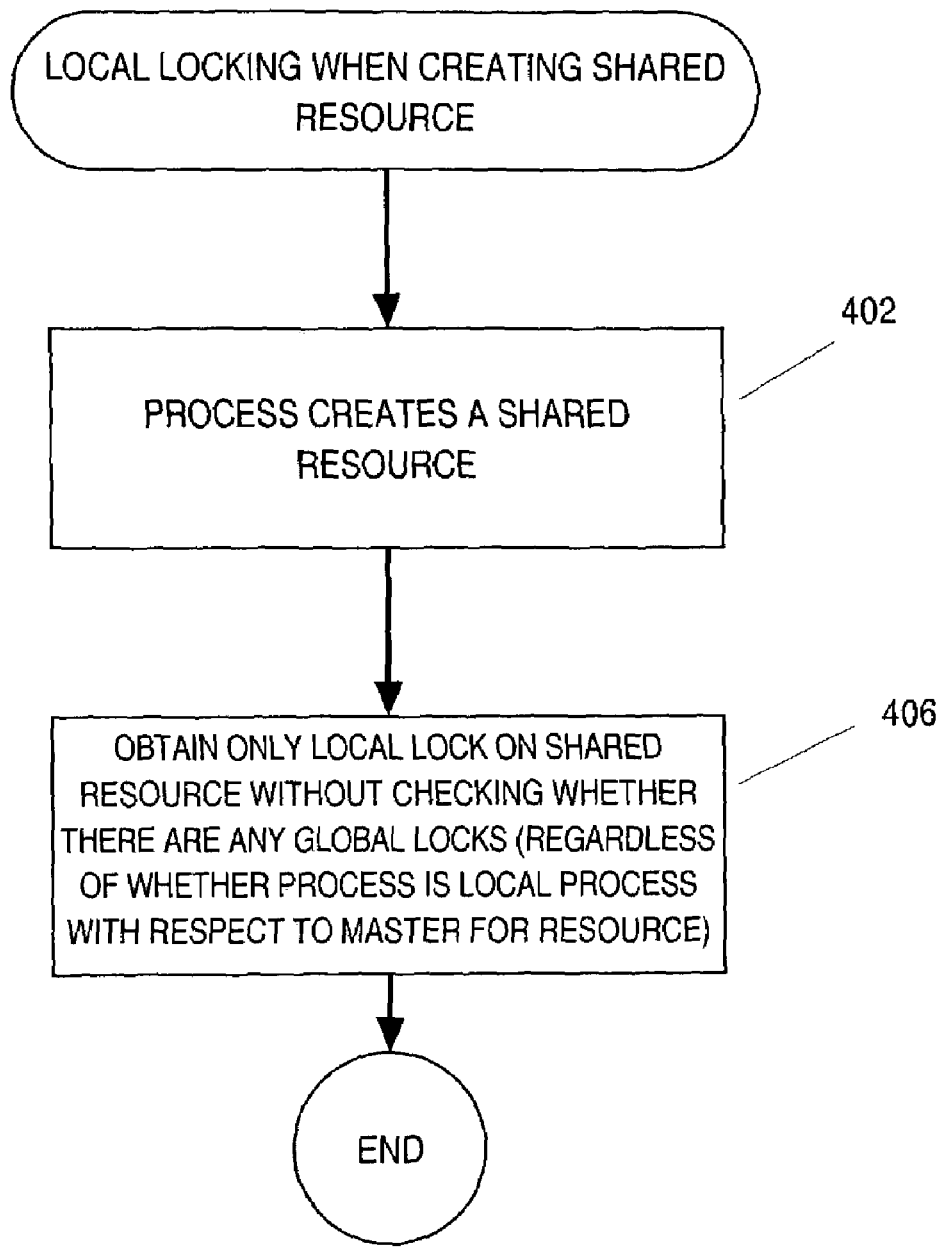
FIG. 4 is a flow chart depicting a process for global synchronization of a shared resource using only local locks for processes that create the shared resource according to an embodiment of the present invention.

FIG. 4 depicts a flow chart for deferring global locks when creating a shared resource. At step 402, a process creates a shared resource. At step 406, in response to creating a shared resource, the process obtains only a local lock on the shared resource.

It can be advantageous to grant only a local lock to the "creating process" creating a shared resource even when the process is not a local process with respect to the master. Because no other process should have a global lock on the process, there is no need to incur the cost of inter-node communication to determine whether a global lock is being held for the shared resource. Even if the master is local to the creating process, there is no need to execute instructions to determine whether there is a global lock for the shared resource. If another process on another node requires a global lock before the creating process relinquishes the local lock, the master may later issue a global lock to the creating process. Issuing the global lock may require communication between the master node and the local node of the creating process. In order to communicate with this node, the master node needs to know the local node of the creating process. The local node creating the process may be identified in several ways, depending on how a master node is able to identify processes that have created a shared resource. For example, when a process requests a lock on a resource, they transmit a request that contains an identifier of the resource. Some types of identifiers contain information identifying the node that created the resource. From the identifier, the master node is able to identify the node that created the resource. The master node communicates with this node to provide a global lock on the shared resource.

Alternatively, the master node may broadcast messages to other nodes requesting that the node holding a local lock on the resource acknowledge and identify itself. The node of the creating process then responds accordingly.

The global synchronization techniques for global lock elimination or deferral described herein offer advantages over other techniques for minimizing the costs of global synchronization. As mentioned previously, access-pattern based mastering by itself reduces inter-node communication but does not eliminate the overhead associated with executing additional instructions and creating additional data structures for global locks. The techniques discussed herein that eliminate global locking reduce, and, in many cases, eliminate such overhead. Furthermore, these techniques are not afflicted with false contention that afflicts course-grain locking and the additional overhead that disproportionately impacts the node triggering de-escalation that afflicts hierarchical locking.

Hardware Overview

Figure 5:
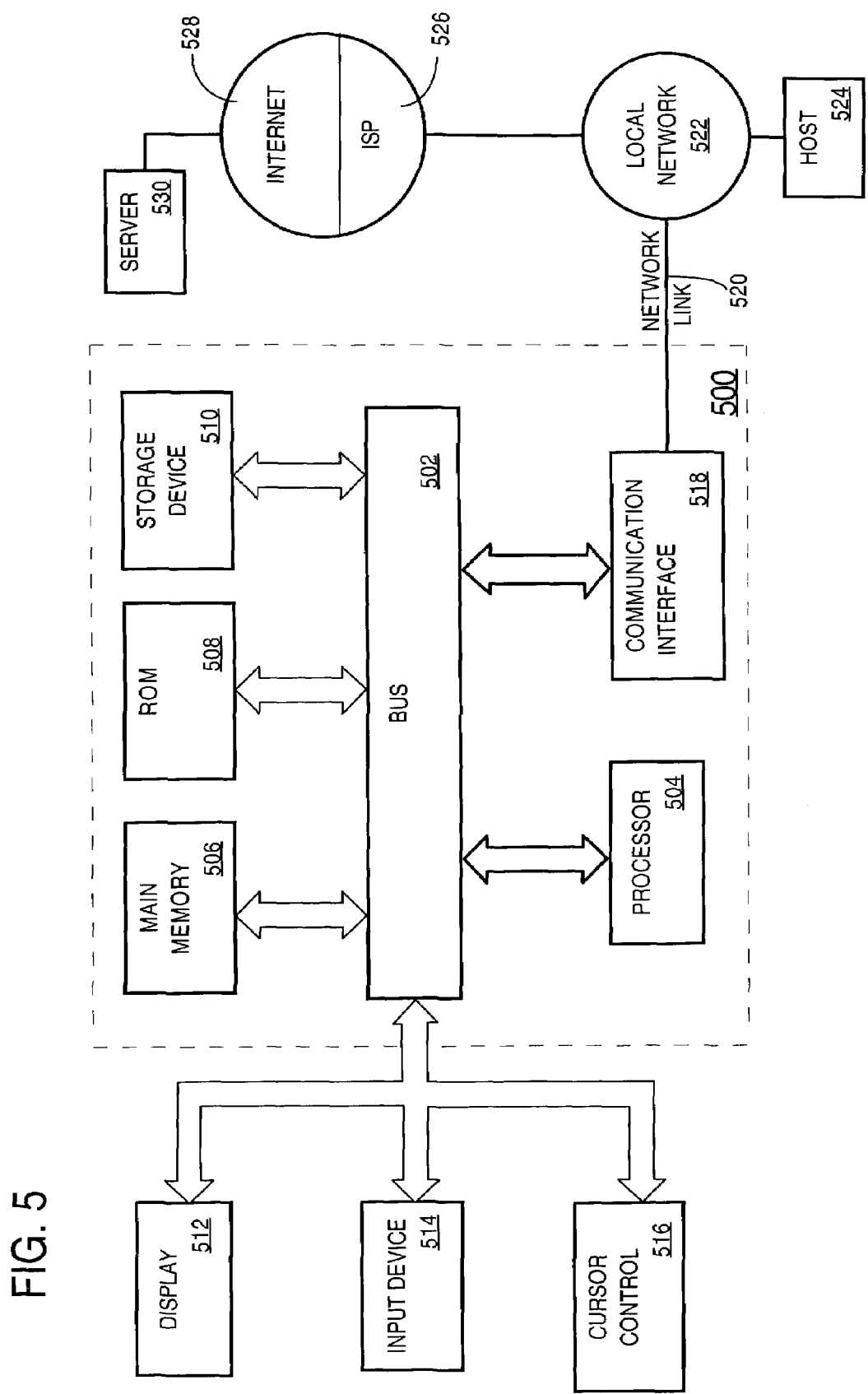
FIG. 5 is a block diagram of a computer system that may be used to implement an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing locks granted to processes on a multi-node system to access a set of shared resources that includes a first shared resource, the method comprising the steps of:
    the multi-node system allowing processes on a first node of the multi-node system to access the first shared resource based on local locks and allowing processes on other nodes of the multi-node system to access the first shared resource based on global locks;
    granting a first local lock on the first shared resource to a first process on the first node; and
    while a global lock on the first shared resource is not held by any node of said multi-node system, permitting the first process to access the first shared resource based on the first local lock.

2. The method of claim 1, further comprising the step of:
    while said first process holds said first local lock, in response to a request from another process that requires a grant of a global lock on the first shared resource, causing the first process to obtain a global lock on the first shared resource.

3. A computer-readable storage medium carrying one or more sequences of instructions which, when executed by one or more processors, causes the one or more processors to perform the method recited in claim 2.

4. The method of claim 1, wherein:
    the method includes receiving a request from the first process for a lock on the first shared resource that allows the first process to access the, first shared resource;
    the method includes determining, based on one or more conditions, whether the request from the first process may be honored by granting only a local lock; and
    the step of permitting the first process to access the first shared resource is performed only if the request from the first process may be honored by granting only a local lock.

5. The method of claim 4, wherein the one or more conditions include that the first shared resource is not globally locked by another process.

6. A computer-readable storage medium carrying one or more sequences of instructions which, when executed by one or more processors, causes the one or more processors to perform the method recited in claim 5.

7. A computer-readable storage medium carrying one or more sequences of instructions which, when executed by one or more processors, causes the one or more processors to perform the method recited in claim 4.

8. The method of claim 4, wherein the one or more conditions include that the first shared resource is mastered by another node other than the first node.

9. A computer-readable storage medium carrying one or more sequences of instructions which, when executed by one or more processors, causes the one or more processors to perform the method recited in claim 8.

10. The method of claim 1, wherein the first shared resource is mastered by the first node.

11. A computer-readable storage medium carrying one or more sequences of instructions which, when executed by one or more processors, causes the one or more processors to perform the method recited in claim 10.

12. The method of claim 1, the method further including permitting other processes on the first node to access the first shared resource based on a local lock granted by the first node to each of the other processes.

13. A computer-readable storage medium carrying one or more sequences of instructions which, when executed by one or more processors, causes the one or more processors to perform the method recited in claim 12.

14. The method of claim 1, wherein the step of granting a first local lock is performed in response to the first process creating the first shared resource.

15. The method of claim 14, wherein the first shared resource is mastered by another node other than the first node.

16. A computer-readable storage medium carrying one or more sequences of instructions which, when executed by one or more processors, causes the one or more processors to perform the method recited in claim 14.

17. The method of claim 15, further including the step of assigning the first node a master of the first shared resource in response to determining that the first node most frequently accesses the first shared resource relative to other nodes of the multi-node system.

18. A computer-readable storage medium carrying one or more sequences of instructions which, when executed by one or more processors, causes the one or more processors to perform the method recited in claim 15.

19. A computer-readable storage medium carrying one or more sequences of instructions which, when executed by one or more processors, causes the one or more processors to perform the method recited in claim 17.

20. A computer-readable storage medium carrying one or more sequences of instructions which, when executed by one or more processors, causes the one or more processors to perform the method recited in claim 1.

* * * * *